W. W. GRAFF.
ELECTRIC WATER HEATER.
APPLICATION FILED JULY 6, 1921.

1,417,315.

Patented May 23, 1922.
2 SHEETS—SHEET 1.

INVENTOR
W. W. Graff.
BY John A. Bonnerhardt
ATT'Y

W. W. GRAFF.
ELECTRIC WATER HEATER.
APPLICATION FILED JULY 6, 1921.
1,417,315.
Patented May 23, 1922.
2 SHEETS—SHEET 2.
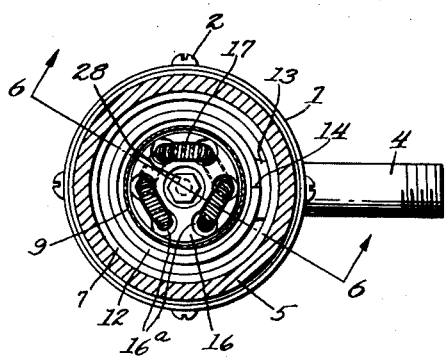
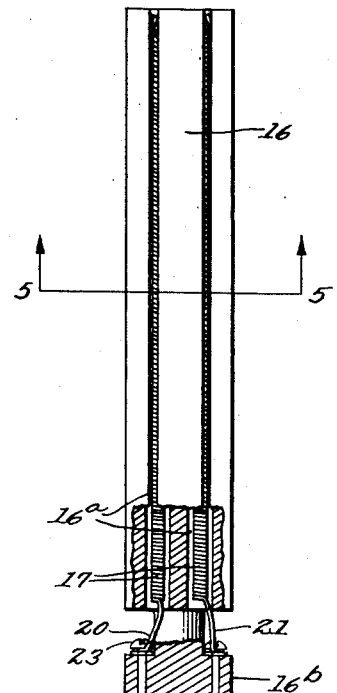
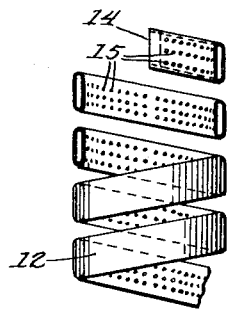
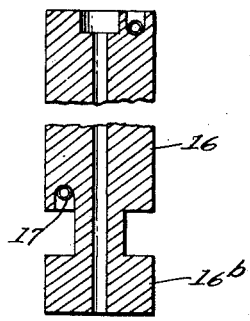
INVENTOR
W. W. Graff
BY John A. Bommhardt
ATT'Y

UNITED STATES PATENT OFFICE.

WALTER W. GRAFF, OF CLEVELAND, OHIO.

ELECTRIC WATER HEATER.

1,417,315.     Specification of Letters Patent.     Patented May 23, 1922.

Application filed July 6, 1921. Serial No. 482,758.

*To all whom it may concern:*

Be it known that I, WALTER W. GRAFF, a citizen of the United States, residing at Cleveland, in the county of Cuyahoga and State of Ohio, have invented certain new and useful Improvements in Electric Water Heaters, of which the following is a specification.

This invention relates to electric water heaters of that type in which the water is admitted at one end of a chamber and discharged at the opposite end, being heated by an electric heating element during its flow through the chamber.

The object of the invention is to provide an improved device of this kind, a special feature of which is a tubular coil through which the water flows, this coil being provided with a large number of small holes through which the water is sprayed from the coil on to a central heated tube containing the heating element, after which the water passes to the outlet pipes.

A further object of the invention is to simplify and improve the construction of such a heater in the particulars to be hereinafter more fully described.

Figure 1:
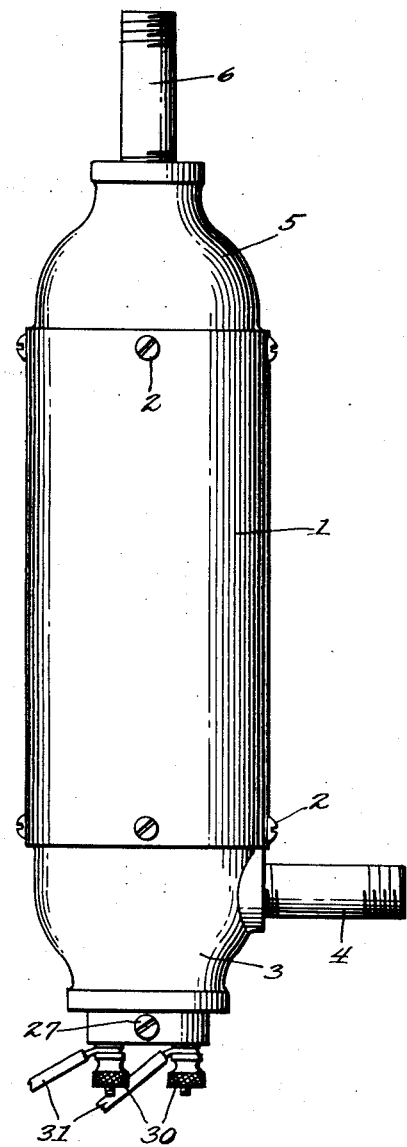
Figure 2:
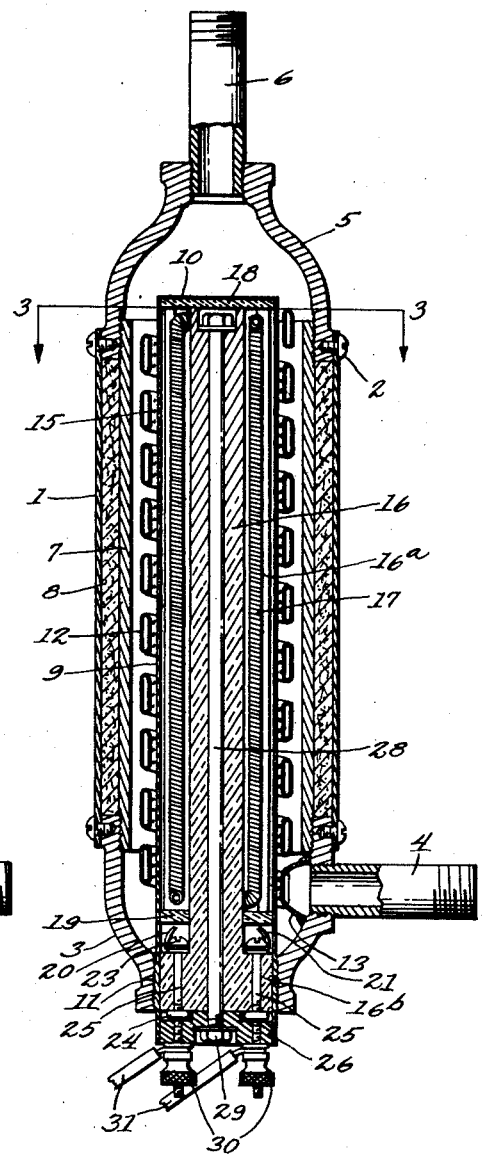

In the accompanying drawings Fig. 1 is a side elevation of the heater. Fig. 2 is a vertical longitudinal section. Fig. 3 is a section on the line 3—3 of Fig. 2. Fig. 4 is a detail, partly in section, of the heating element. Fig. 5 is a section on the line 5—5 of Fig. 4. Fig. 6 is a detail in section of the porcelain core or member for supporting the heating coils. Fig. 7 is a detail of the water tube coil.

Referring specifically to the drawings, 1 indicates the cylindrical casing or outer shell of the heater, attached at its opposite ends by screws 2 to reduced neck couplings 3 and 5, of which the former is at the lower or inlet end of the heater and the latter at the upper or outlet end. The water inlet pipe is indicated at 4, being tapped into the neck 3, and the outlet pipe to service is indicated at 6, tapped into the neck 5. 7 is an inner tube or sleeve which is screwed at its opposite ends into the necks 3 and 5 and serves to confine the body of water in the heater. The space between the tube 7 and the shell 1 is packed with asbestos 8 or other non-conductor of heat.

Within the tube 7, and spaced therefrom, is a brass or copper tubing 9 which is closed at its upper end by a plug or cap 10. The lower end of this tube 9 is screwed at 11 into the lower end of the neck 3, and this tube 9 incloses the heating element.

Located in the space between the tubes 7 and 9 is a spiral water tube 12 which is preferably flattened axially as shown in Fig. 7. The upper end of this coil is sealed as shown at 14, and throughout its length the inside wall of the tube is provided with a large number of small holes 15. The lower end of the coil is connected as at 13 to the inlet pipe 4, so that the cold water flows from said pipe into said coil and is discharged through the holes 15 against the outside of the tube 9.

The heating element enclosed in the tube 9 comprises a porcelain member 16, cylindrical in general outline, and containing a plurality of longitudinal undercut grooves 16ª in which the heating coils or wires 17 are placed, and a washer or disk 18 of mica or the like is fitted on top of the porcelain member 16, under the cap 10, to insulate the heating coils therefrom. Below the coils another mica washer 19 is placed around the porcelain, to support the heating coils in case of any tendency to sag. The leads 20 and 21 of the coils extend through this washer 19 and are connected to binding posts 25 which are confined by their heads 23 and nuts 24 in the bottom plug 16ᵇ of the porcelain. 26 is an insulating plug secured in the lower end of the tube 9 by screws 27, and the plug and porcelain member are connected by a long screw 28 which extends through a hole in the plug and a central bore in the porcelain and is secured by a nut 29. The posts 25 extend through the plug and are provided with nuts 30 for connection of the supply wires 31.

In the operation of the device the heating element, when the current is turned on, heats the tube 9, by means of the adjacent coils 17. The water entering at the pipe 4 into the pipe 12 is sprayed from the coils of the latter through the holes 15 against the external surface of the pipe 9 and is heated thereby, the hot water then flowing through the space between the pipes 7 and 9 and the neck 5 to the service pipe 6. I have found that by directing the numerous sprays of cold water against the heated surface of the pipe 9 the water is almost instantaneously heated and can be drawn off continuously in its heated condition, the sprays being so numerous that a very quick and reliable heating action is effected. The parts may be readily assembled, and the heating element as a whole can be readily removed from the lower end of the heater by taking out the screws 27, and without disconnecting the water pipes. This is highly desirable in cases where repairs are necessary.

The device has other advantages of simplicity and cheapness which will be apparent to those skilled in the art, and may be embodied in various forms within the scope of the following claims.

I claim:

1. A heater comprising a casing, a tube within the same, a heating element inside the tube, and a water pipe between the casing and the tube, having a plurality of spray holes directed toward the tube.

2. An electric heater comprising an outer tubular casing, an inner tube within the same and spaced therefrom, an electric heating element inside the tube, and a coiled water pipe in the space between the tube and the casing, having numerous spray holes directed toward the inner tube.

3. An electric water heater comprising an outer tubular casing having a water outlet at one end, a tube within said casing and spaced therefrom, the inner end of the tube being closed, and the outer end of the tube extending through the end of the casing, a longitudinal heating element insertible through the open end of the tube, and a perforated water inlet pipe coiled in the space between the tube and casing.

4. An electric heater comprising an outer tubular casing, an inner tube within said casing, a heating element inside said tube, and a coiled water pipe located between said tube and casing and coiled around the tube, said pipe having a supply connection at one end and being flattened parallel to its axis, the inner flattened side of the tube having a plurality of small holes directed toward the outer surface of the inner tube.

In testimony whereof, I do affix my signature in presence of two witnesses.

WALTER W. GRAFF.

Witnesses:
JOHN A. BOMMHARDT,
BESSIE F. POLLAK.